US012562558B2

(12) United States Patent
Shin et al.

(10) Patent No.: US 12,562,558 B2
(45) Date of Patent: Feb. 24, 2026

(54) SEGMENTED BEND RESTRICTOR SYSTEM WITH FULL DISASSEMBLY CAPABILITY

(71) Applicant: Panduit Corp., Tinley Park, IL (US)

(72) Inventors: Jung Hoon Shin, Ulsan (KR); Nahee Park, Ulsan (KR)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/757,903

(22) Filed: Jun. 28, 2024

(65) Prior Publication Data

US 2025/0246892 A1      Jul. 31, 2025

Related U.S. Application Data

(60) Provisional application No. 63/624,876, filed on Jan. 25, 2024.

(51) Int. Cl.
| | |
|---|---|
| *H02G 15/007* | (2006.01) |
| *F16L 57/02* | (2006.01) |
| *H02G 9/02* | (2006.01) |

(52) U.S. Cl.
CPC ............ *H02G 15/007* (2013.01); *F16L 57/02* (2013.01); *H02G 9/02* (2013.01)

(58) Field of Classification Search
CPC ......... F16L 57/00; F16L 57/005; F16L 57/02; F16L 57/06; F16L 1/123; H02G 15/007; H02G 9/02; E21B 17/017
USPC ........ 285/114, 115, 116, 146.1, 146.2, 146.3
See application file for complete search history.

(56) References Cited

U.S. PATENT DOCUMENTS

| | | | | | |
|---|---|---|---|---|---|
| 899,623 | A | * | 9/1908 | Royer | .................... F16L 27/111 |
| | | | | | 138/120 |
| 4,739,801 | A | * | 4/1988 | Kimura | ................... F16G 13/16 |
| | | | | | 174/68.2 |
| 6,039,081 | A | * | 3/2000 | Albert | .................... F16L 1/123 |
| | | | | | 138/120 |
| 9,401,589 | B2 | * | 7/2016 | Sturges | ............... H02G 3/0475 |
| 11,268,646 | B2 | | 3/2022 | Gronvold | |
| 2009/0126819 | A1 | * | 5/2009 | Beesley | ................... H02G 1/10 |
| | | | | | 138/120 |
| 2015/0035271 | A1 | * | 2/2015 | Luce | ..................... F16L 57/005 |
| | | | | | 285/114 |
| 2018/0209576 | A1 | * | 7/2018 | Whitefield | .............. H02G 9/12 |
| 2020/0116292 | A1 | | 4/2020 | Gronvold | |
| 2022/0214004 | A1 | | 7/2022 | Zahuranec | |
| 2022/0407301 | A1 | | 12/2022 | Gjolmesli et al. | |

FOREIGN PATENT DOCUMENTS

| | | |
|---|---|---|
| CN | 110635438 A | 12/2019 |
| CN | 11371060 A | 7/2020 |
| EP | 2700864 A2 | 2/2014 |
| NO | 320897 B1 | 2/2006 |
| WO | 2010136801 A1 | 12/2010 |

* cited by examiner

*Primary Examiner* — David Bochna
(74) *Attorney, Agent, or Firm* — Peter S. Lee; Christopher S. Clancy; James H. Williams

(57)      ABSTRACT

A segmented bend restrictor system and method for installing such a segmented bend restrictor system that is configured to be disassembled at discrete locations to minimize unnecessary disassembly. The disclosed segmented bend restrictor system offers a more efficient disassembly operation, while also providing an easy and efficient installation operation.

12 Claims, 11 Drawing Sheets

SEGMENTED BEND RESTRICTOR SYSTEM WITH FULL DISASSEMBLY CAPABILITY

CROSS-REFERENCE TO RELATED APPLICATION(S)

This application claims benefit to U.S. Provisional Patent Application No. 63/624,876, filed on Jan. 25, 2024, the entirety of which is hereby incorporated by reference herein.

TECHNICAL FIELD

The application relates to the field of subsea cable protection equipment, and more specifically for a segmented bend restrictor system being configured to enable disassembly along any particular location.

BACKGROUND

Offshore energy production has been around for decades and until recently it was oil and gas production. In recent years renewable energy sources are becoming more common and offshore installations are popular in areas where available land is too expensive or not available. Regardless of the type of offshore installation, power and data transmission are necessary and cables are used for the transmission of the power and data. The cables used for offshore installations need to be protected from abrasion, sharp objects, kinks, excessive underwater movement caused by waves, etc.

The style and complexity of the abrasion protection will vary depending on the application. One common type of abrasion protection is for bend restriction. Abrasion protection systems are made from many types of materials including cast iron and ranging to more pliable polyurethane materials. Traditional designs are simplified to only include a single piece design comprised of a male connection end that fits into, and is secured, to a female connection end. Such designs are simple and save installers from accounting for different design pieces. However, if a section along the bend restriction system needs repair, disassembly is an issue because the disassembly needs to start at a free end and work toward the section in need of repair. In other words, such single piece bend restrictor systems cannot be disassembled at the repair location, but rather requires a more extensive disassembly to reach a free end, which may be a long distance away. Thus, this process is costly and time consuming, especially when the cable has been in use, submerged at sea.

SUMMARY

Disclosed herein is a segmented bend restrictor system and method for installing such a segmented bend restrictor system. The segmented bend restrictor system is configured to be disassembled at discrete locations to minimize unnecessary disassembly. Therefore, the disclosed segmented bend restrictor system offers a more efficient disassembly operation, while also providing an easy and efficient installation operation.

A bend restrictor system is disclosed, the system comprising a female half collar comprising a top female half collar and a bottom female half collar, wherein the female half collar comprises an inner cavity when the top female half collar and the bottom female half collar are assembled together; a male half collar comprising a top male half collar and a bottom female half collar, wherein the male half collar comprises a first raised collar on a first end and a second raised collar on a second end; and a weighted stability collar installed inside an inner cavity of the male half collar.

A detailed description of these and other non-limiting exemplary embodiments of the segmented bend restrictor system is set forth below together with accompanying drawings.

DETAILED DESCRIPTION

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

Disclosed herein is a segmented bend restrictor system and method for installing such a segmented bend restrictor system that is configured to be disassembled at discrete locations to minimize unnecessary disassembly. Therefore, the disclosed segmented bend restrictor system offers a more efficient disassembly operation, while also providing an easy and efficient installation operation.

Figures 1A, 1B:
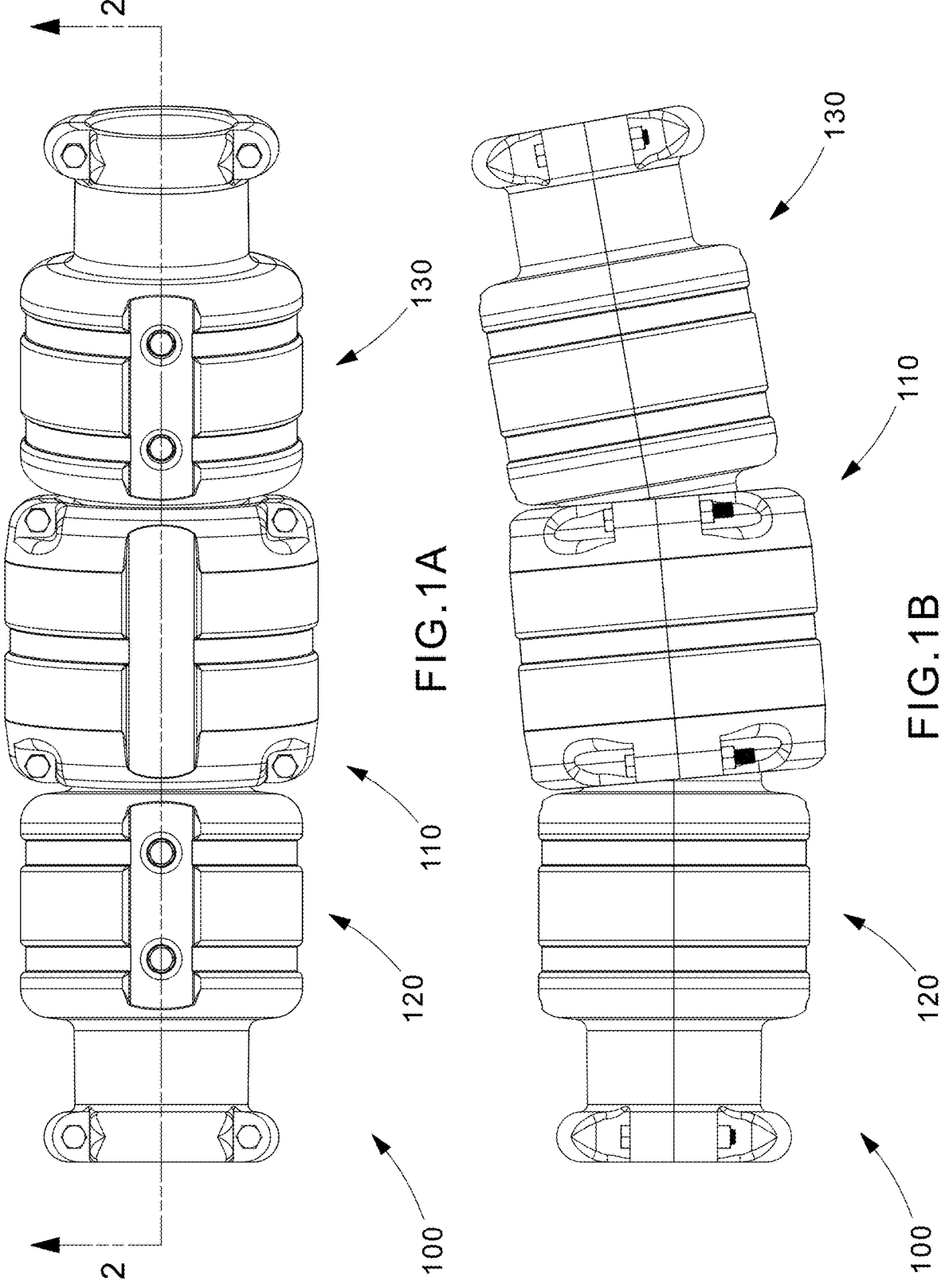
FIG. 1A illustrates a side view of an exemplary bend restrictor system, according to some embodiments of the present disclosure.
FIG. 1B illustrates a side view of the exemplary bend restrictor system shown in FIG. 1A, where the bend restrictor system has been rotated compared to the view shown in FIG. 1A, according to some embodiments of the present disclosure.

FIGS. 1A and 1B show portions of an exemplary bend restrictor system 100 that includes a female half collar 110 in between a first male half collar 120 and a second male half collar 130. The first male half collar 120 and the second male half collar 130 are comprised of the same components and design. The female half collar 110 is configured to overlap portions of the first male half collar 120 and the second male half collar 130 to create a secure coupling to mechanically attach the three components together, as will be described in more detail herein. The bend restrictor system 100 is engineered to cover subsea cabling (e.g., fiber optic cable, power cable, copper cable, etc.) and be installed underwater to restrict bending of the cable installed within it.

Figure 2:
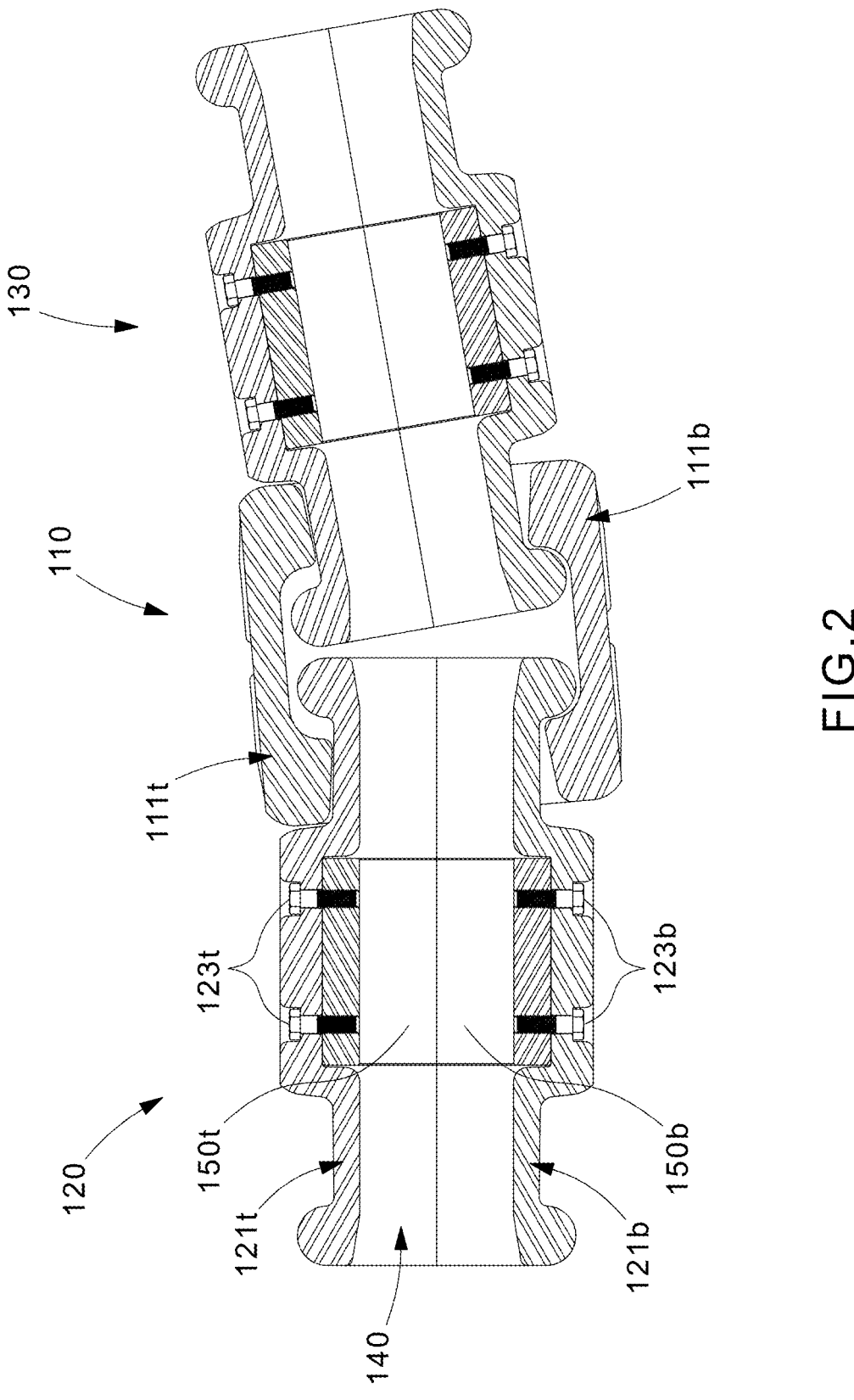
FIG. 2 illustrates a section view of the bend restrictor system shown in FIG. 1A taken along the line 2-2, according to some embodiments of the present disclosure.

The description will focus on describing the components from the first male half collar 120 (hereinafter may be referred to as the "male half collar 120"), but the same components may be provided in the second male half collar 130. FIG. 2 shows the internal components of the bend restrictor system 100 by taking a sectional view along the line 2-2 from the bend restrictor system 100 shown in FIG. 1A. The male half collar 120 is comprised of a top male half collar 121t and a bottom male half collar 121b. The female half collar 110 is comprised of a top female half collar 111t and a bottom female half collar 111b.

The sectional view of FIG. 2 shows that the bend restrictor system 100 may include a weighted stability collar 150t, 150b inside the male half collars 120, 130. The weighted stability collar 150t, 150b is comprised of a top weighted stability collar 150t and a bottom weighted stability collar 150b, that is housed within an internal cavity of the male half collar 120. The weighted stability collar 150t, 150b may be made from a metal material such as stainless steel and may be included in one or more of the male half collars 120 that are included in the overall length of the bend restrictor system 100. The top weighted stability collar 150t may be factory installed into the top cavity 122t of the top male half collar 121t, and the bottom weighted stability collar 150b may be factory installed into the bottom cavity 122b of the bottom male half collar 121b. Alternatively, the top weighted stability collar 150t and/or the bottom weighted stability collar 150b may be installed at an installation site as needed. The weighted stability collar 150t, 150b helps provide stability to the bend restrictor system 100 when it is part of a subsea or seabed installation.

Figure 3:
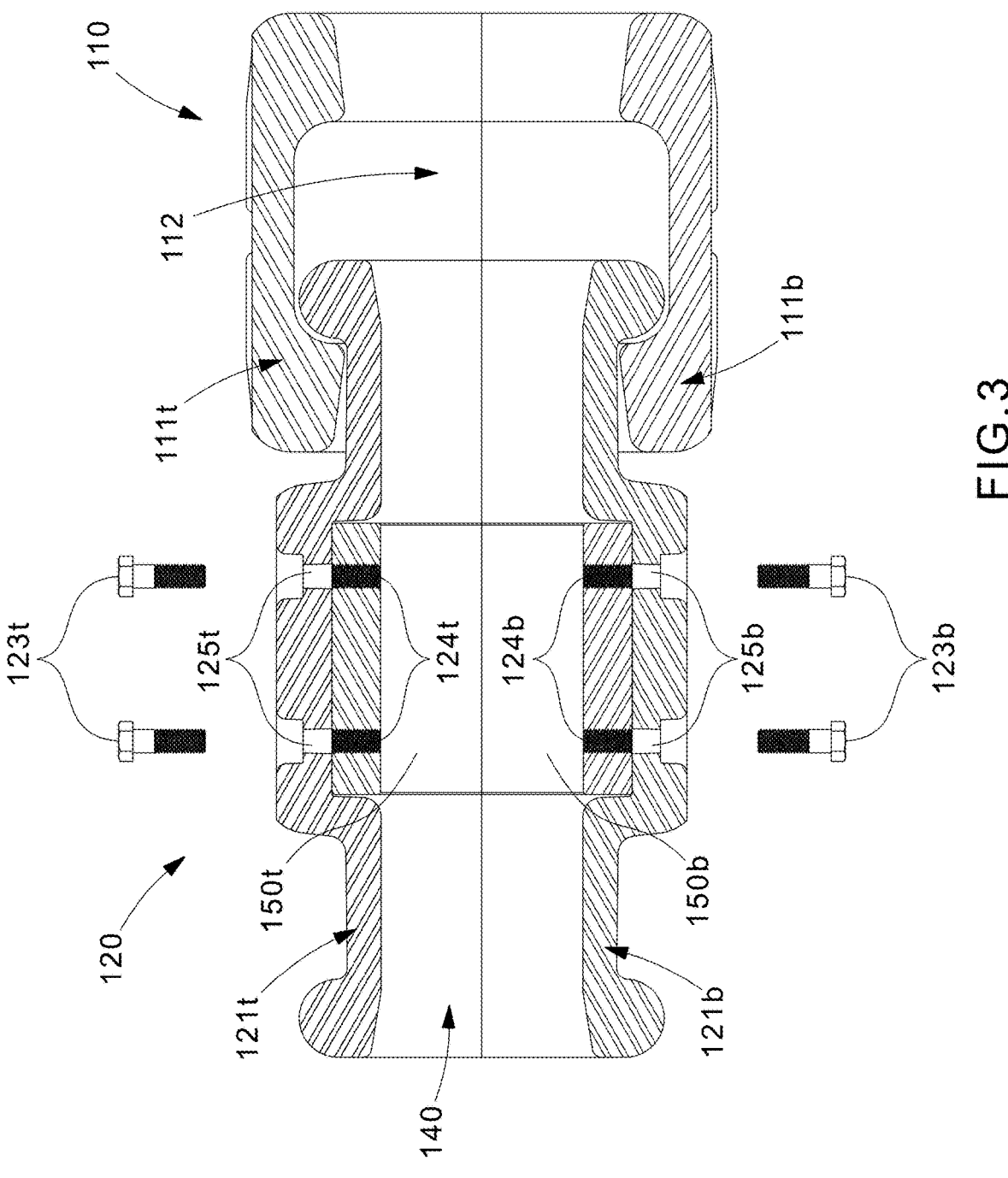
FIG. 3 illustrates a section view of a portion of the bend restrictor system shown in FIG. 1A taken along the line 2-2, according to some embodiments.
Figure 4:
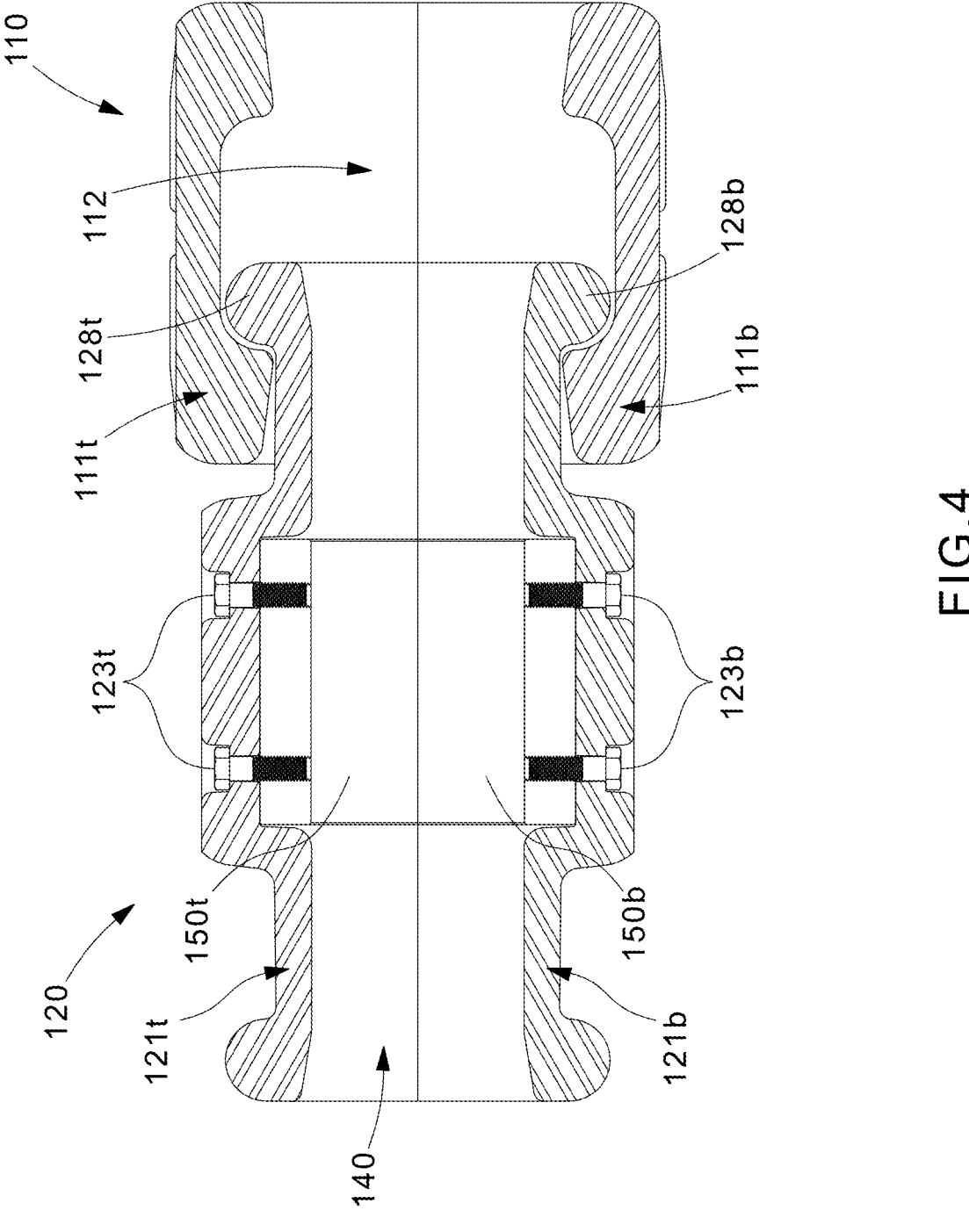
FIG. 4 illustrates a section view of a portion of the bend restrictor system shown in FIG. 1A taken along the line 2-2, according to some embodiments.

To secure the top weighted stability collar 150t onto the top male half collar 121t, a pair of top fasteners 123t are fastened through a pair of top holes 125t of the top male half collar 121t and fastened into a pair of threaded holes 124t in the top weighted stability collar 150t, as shown in FIGS. 3 and 4. Similarly, to secure the bottom weighted stability collar 150b onto the bottom male half collar 121b, a pair of bottom fasteners 123b are fastened through a pair of bottom holes 125b of the bottom male half collar 121b and fastened into a pair of threaded holes 124b in the bottom weighted stability collar 150b, as shown in FIGS. 3 and 4.

FIGS. 3 and 4 show a magnified view of the inner workings of the male half collar 120 and the female half collar 110, providing a more detailed view of the mechanical coupling created to secure the male half collar 120 to the female half collar 110. The ends of the male half collar 120 include a raised collar 128t, 128b configured to fit inside an inner cavity 112 of the female half collar 110. When assembled, the male half collar 120 forms a cable tunnel 140 for surrounding a protected cable assembly, where the cable tunnel 140 runs the length of the bend restrictor system 100 to cover the cable assembly in a subsea installation. The cable assembly may include one or more cables protected by a protective covering such as a polyurethane shell.

Figure 5:
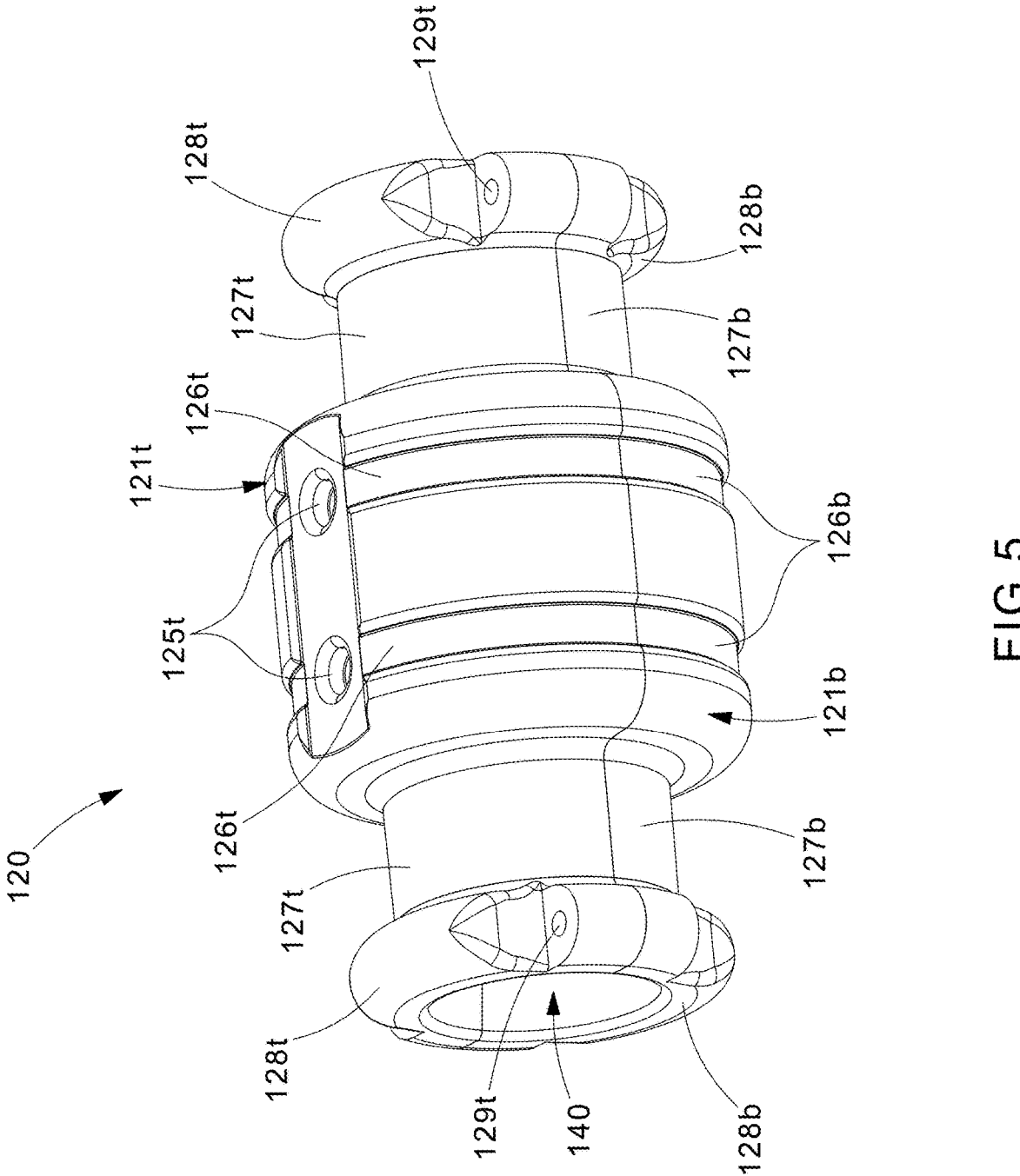
FIG. 5 illustrates a perspective view of a male collar included in the bend restrictor system shown in FIG. 1A, according to some embodiments.
Figure 6:
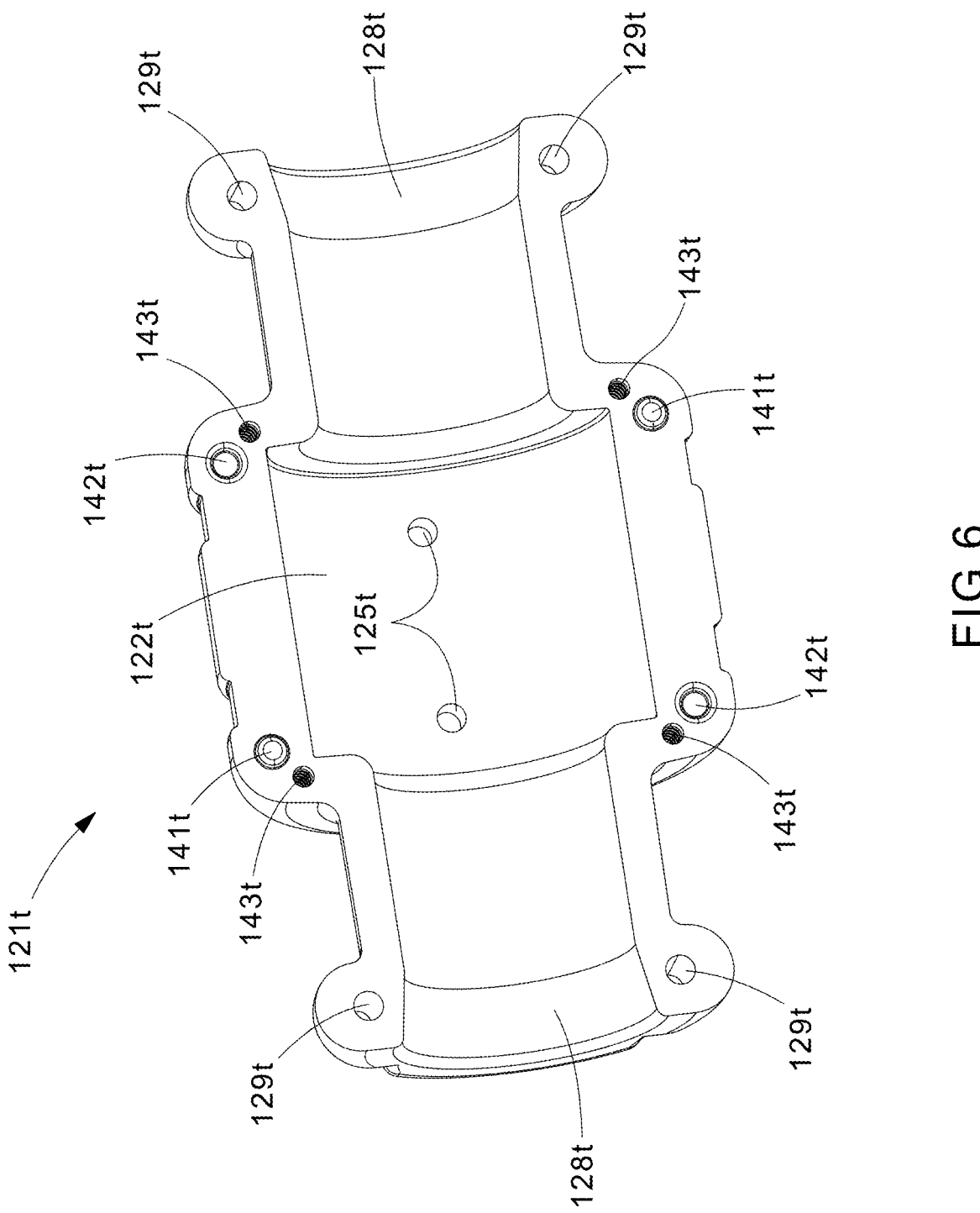
FIG. 6 illustrates a perspective view of a top half of the male collar shown in FIG. 5, according to some embodiments.
Figure 7:
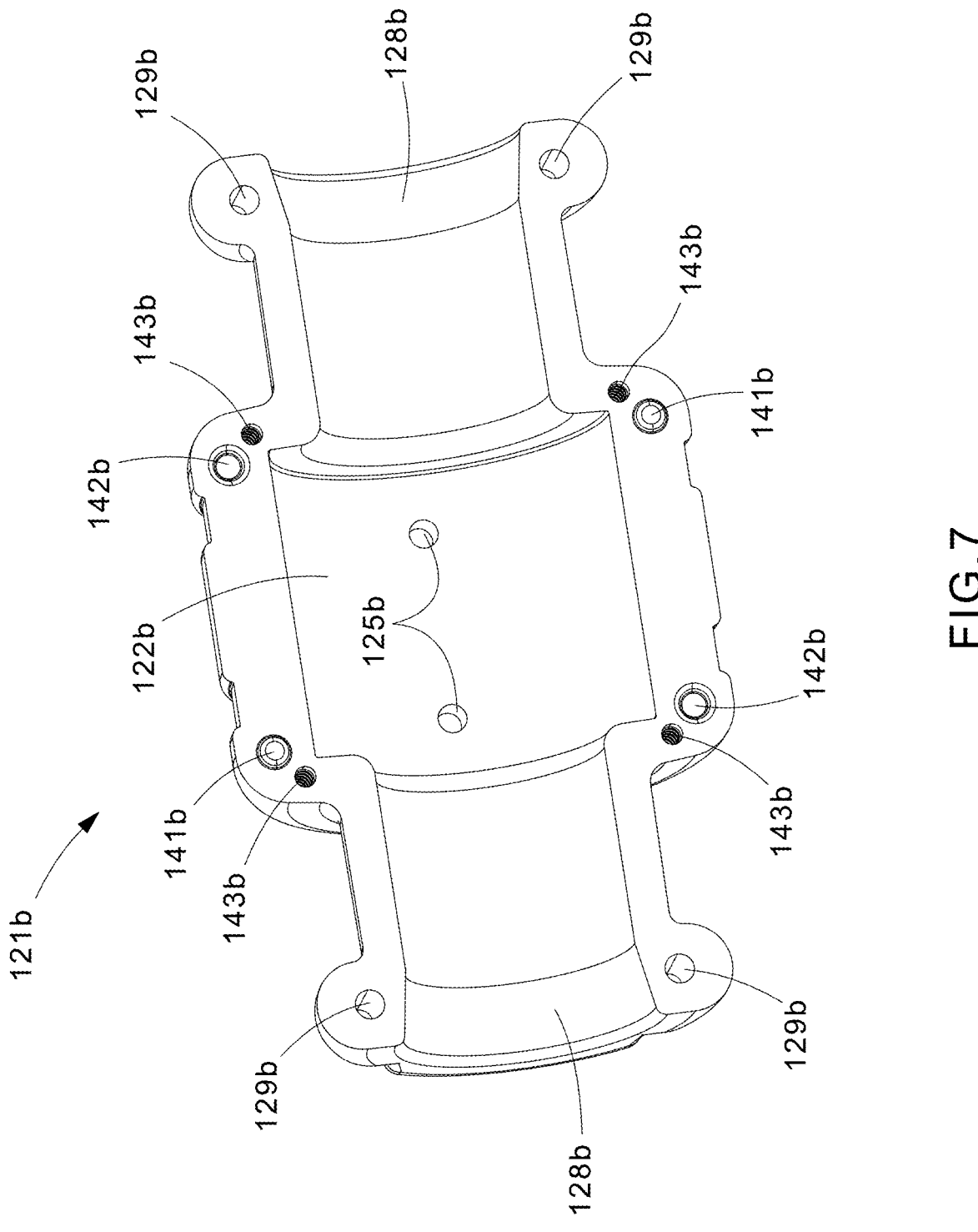
FIG. 7 illustrates a perspective view of a bottom half of the male collar shown in FIG. 5, according to some embodiments.

FIG. 5 is a perspective view of the male half collar 120 in an assembled state by bringing the top male half collar 121t together with the bottom male half collar 121b, according to some embodiments. FIG. 6 is a perspective bottom-side view of the top male half collar 121t showing the inside of the top male half collar 121t, and FIG. 7 is a perspective bottom-side view of the bottom male half collar 121b. The top male half collar 121t includes male alignment disc protrusions 141t configured to fit into female alignment recesses 142b in the bottom male half collar 121b, and the bottom male half collar 121b includes male alignment disc protrusions 141b configured to fit into female alignment recesses 142t in the top male half collar 121t, to achieve alignment when bringing the top male half collar 121t and the bottom male half collar 121b together in the assembled state.

The raised collar 128t, 128b in the male half collar 120 is comprised of a top raised collar 128t and a bottom raised collar 128b. The top raised collar 128t includes through holes 129t, and the bottom raised collar 128b includes through holes 129b, that align with each other when the top male half collar 121t and the bottom male half collar 121b are aligned together in the assembled state. A fastener is then placed through the through holes 129t, 129b to help secure the top male half collar 121t and the bottom male half collar 121b together in the assembled state. The top male half collar 121t includes threaded holes 143t (e.g., four) used to lift the top male half collar 121t during a manufacturing process. Similarly, the bottom male half collar 121b includes threaded holes 143b (e.g., four) used to lift the bottom male half collar 121b during a manufacturing process.

As shown in FIG. 5, the male half collar 120 includes grooves 126t, 126b where bands, clamps, or cable ties may be installed to further secure the attachment between the top male half collar 121t and the bottom male half collar 121b. The top male half collar 121t includes the top grooves 126t, and the bottom male half collar 121b includes the bottom grooves 126b. The male half collar 120 also includes mating grooves 127t, 127b that enables spacing for the female half collar 110 to be secured over the raised collar 128t, 128b of the male half collar 120. The top male half collar 121t includes top mating grooves 127t, and the bottom male half collar 121b includes bottom mating grooves 127b.

Figure 8:
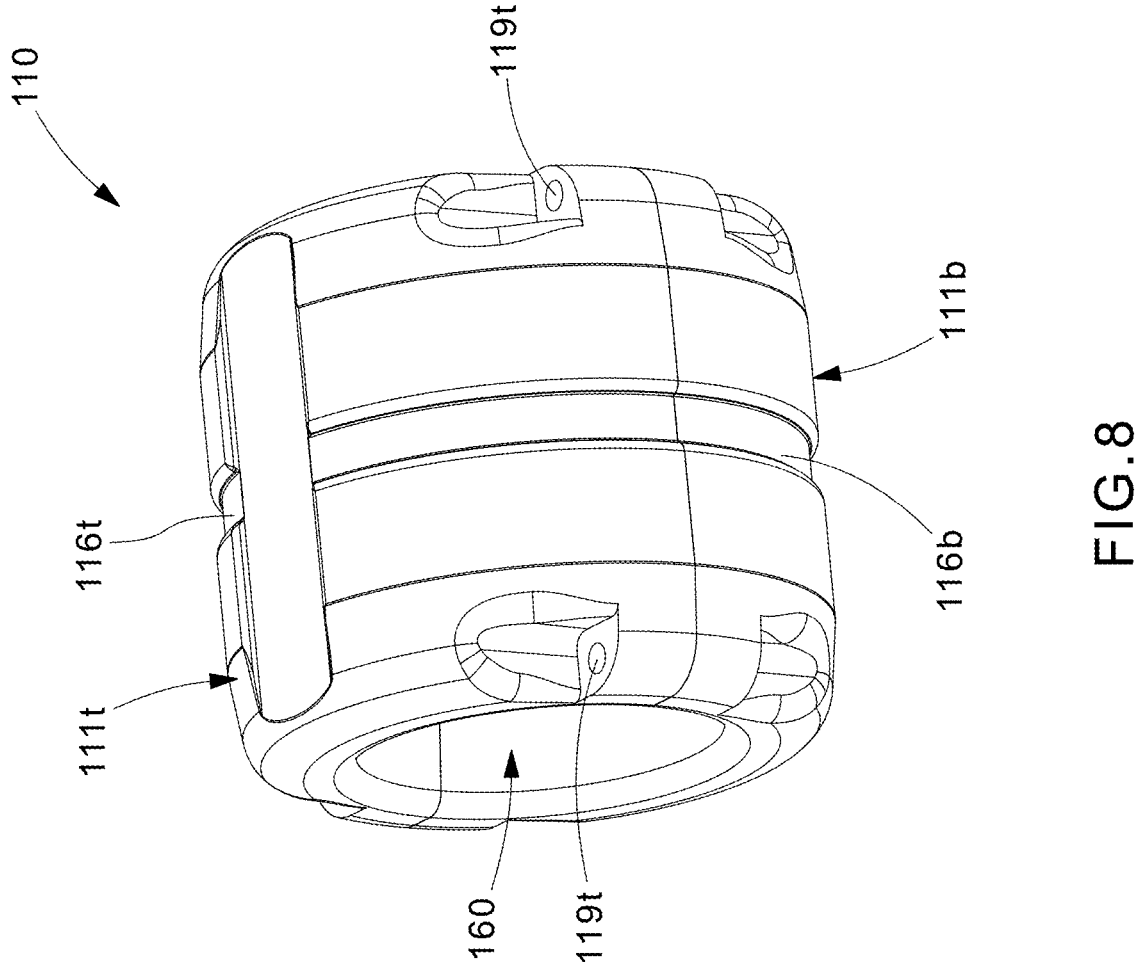
FIG. 8 illustrates a perspective view of a female collar included in the bend restrictor system shown in FIG. 1A, according to some embodiments.
Figure 9:
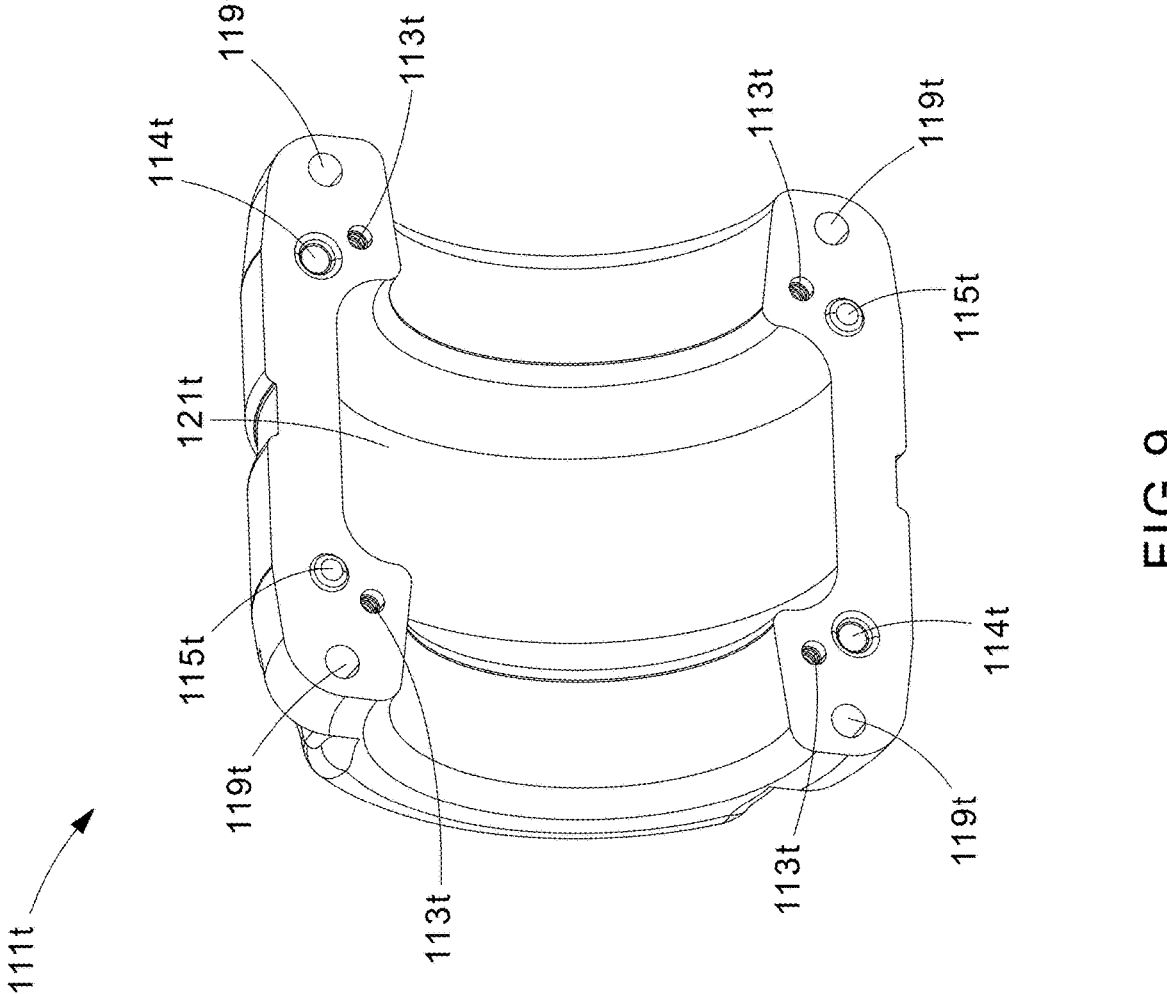
FIG. 9 illustrates a perspective view of a top half of the female collar shown in FIG. 8, according to some embodiments of the present disclosure.
Figure 10:
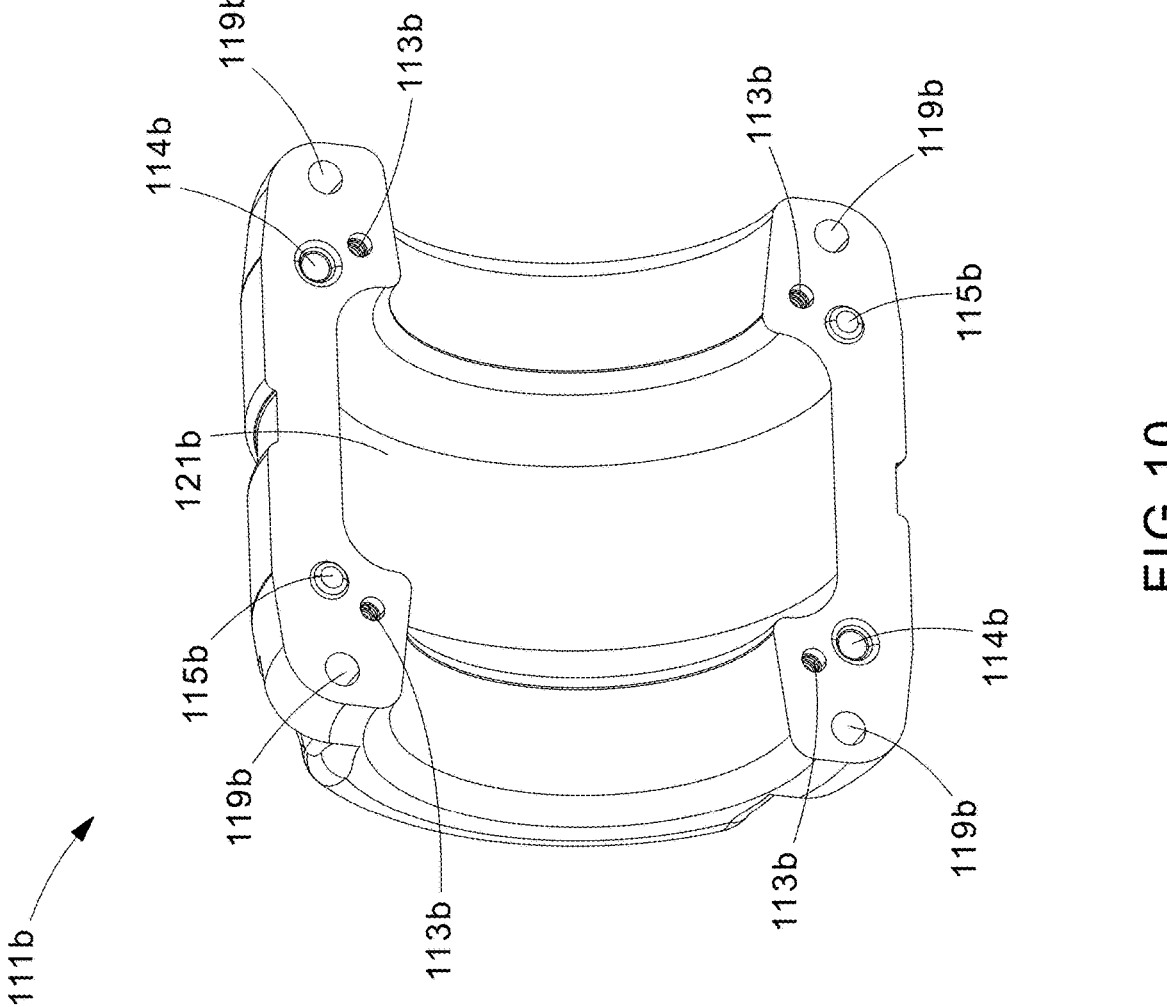
FIG. 10 illustrates a perspective view of a bottom half of the female collar shown in FIG. 8, according to some embodiments of the present disclosure.

FIG. 8 is a perspective view of the female half collar 110 in an assembled state by bringing the top female half collar 111t together with the bottom female half collar 111b, according to some embodiments. FIG. 9 is a perspective bottom-side view of the top female half collar 111t showing the inside of the top female half collar 111t, and FIG. 10 is a perspective bottom-side view of the bottom female half collar 111b. The top female half collar 111t includes male alignment disc protrusions 115t configured to fit into female alignment recesses 114b in the bottom female half collar 111b, and the bottom female half collar 111b includes male alignment disc protrusions 115b configured to fit into female alignment recesses 114t in the top female half collar 111t, to achieve alignment when bringing the top female half collar 111t and the bottom female half collar 111b together in the assembled state.

The female half collar 110 includes an inner cavity 112 that is comprised of a top inner cavity 112t and a bottom inner cavity 112b when the top female half collar 111t is assembled together with the bottom female half collar 111b. The raised collar 128t, 128b from the male half collar 120 is configured to fit inside the inner cavity 112 of the female half collar 110 to form the secure coupling attachment.

The top female half collar 111*t* includes through holes 119*t*, and the bottom female half collar 111*b* includes through holes 119*b*, that align with each other when the top female half collar 111*t* and the bottom female half collar 111*b* are aligned together in the assembled state. A fastener is then placed through the through holes 119*t*, 119*b* to help secure the top female half collar 111*t* and the bottom female half collar 111*b* together in the assembled state. The top female half collar 111*t* includes threaded holes 113*t* (e.g., four) used to lift the top female half collar 111*t* during a manufacturing process. Similarly, the bottom female half collar 111*b* includes threaded holes 113*b* (e.g., four) used to lift the bottom female half collar 111*b* during a manufacturing process.

As shown in FIG. 8, the female half collar 110 includes a groove 116*t*, 116*b* where bands, clamps, or cable ties may be installed to further secure the attachment between the top female half collar 111*t* and the bottom female half collar 111*b*. The top female half collar 111*t* includes the top groove 116*t*, and the bottom female half collar 111*b* includes the bottom groove 116*b*.

Figure 11:
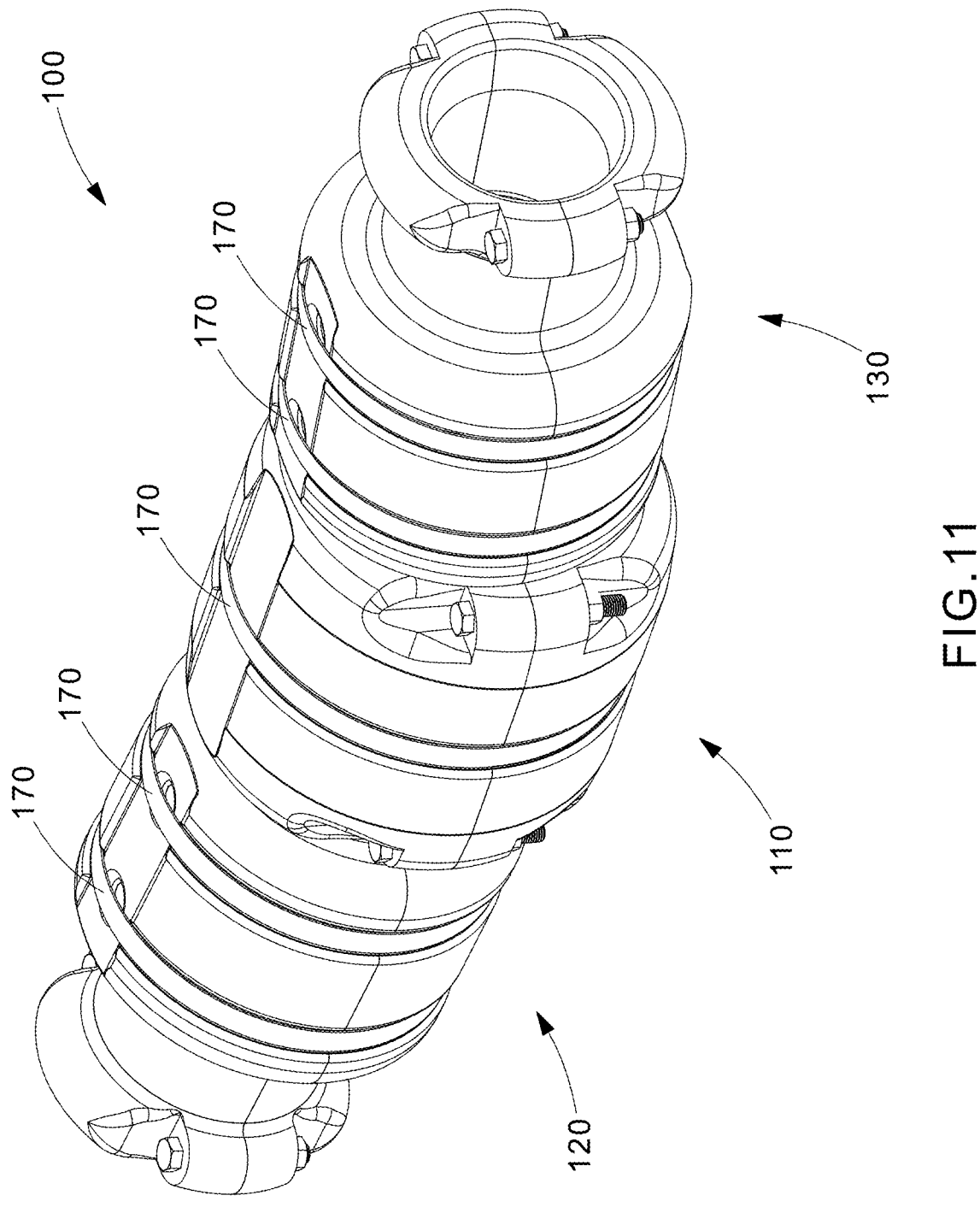
FIG. 11 illustrates a perspective view of a bend restrictor system in an assembled state, according to some embodiments of the present disclosure.

FIG. 11 is a perspective view of the bend restrictor system 100 in an assembled state where securing bands 170 have been installed into their respective grooves on the female half collar 110 and the male half collars 120, 130. The bend restrictor system is advantageous for enabling spot disassembly of any section, allowing controlled cable bending without overbending or kinks. The female half collar 110 and the male half collars 120, 130 may be made from an abrasion resistant polyurethane material, while the fastener and/or banding components may be made from corrosion resistant materials.

An installation process of the Bend Restrictor System 100 may begin with installation of the male half collar 120. The weighted stability collar 150*t*, 150*b* may be installed inside the male half collar 120. The top male half collar 121*t* and the bottom male half collar 121*b* are installed around a cable and secured with supplied fasteners to create the first male half collar 120. A second male half collar 130 is installed in the same manner to be adjacent to the first male half collar 120. The female half collar 110 is installed by using the supplied fasteners to bring the top female half collar 110*t* and the bottom female half collar 111*b* to secure over the raised collars 128*t*, 128*b* of the spanning adjacent male half collars 120, 130. If additional securing is required, the bands 170 may further be installed over the respective grooves 126, 116.

The present disclosure thus describes systems, devices, and methods for implementing a bend restrictor system and method for disassembly utilizing the current approaches described above. As is readily apparent from the foregoing, various non-limiting embodiments of the systems, devices, and methods for utilizing the bend restrictor system have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A bend restrictor system comprising:
   a female half collar comprising a top female half collar and a bottom female half collar, wherein the female half collar comprises an inner cavity when the top female half collar and the bottom female half collar are assembled together;
   a male half collar comprising a top male half collar and a bottom male half collar, wherein the male half collar comprises a first raised collar on a first end and a second raised collar on a second end; and
   a weighted stability collar installed inside an inner cavity of the male half collar, wherein the weighted stability collar is made from stainless steel.

2. The bend restrictor system of claim 1, wherein the weighted stability collar comprises a top weight installed onto the top male half collar, wherein the top weight includes at least one threaded hole.

3. The bend restrictor system of claim 2, wherein the top male half collar includes at least one top hole configured to receive a fastener to be threaded into the threaded hole of the top weight to secure the top weight to the top male half collar.

4. The bend restrictor system of claim 1, wherein the weighted stability collar comprises a bottom weight installed onto the bottom male half collar, wherein the bottom weight includes at least one threaded hole.

5. The bend restrictor system of claim 4, wherein the bottom male half collar includes at least one top hole configured to receive a fastener to be threaded into the threaded hole of the bottom weight to secure the bottom weight to the bottom male half collar.

6. The bend restrictor system of claim 1, wherein the female half collar and the male half collar are made from a polyurethane material.

7. The bend restrictor system of claim 1, the female half collar further comprising a groove channel configured to receive a clamping band.

8. The bend restrictor system of claim 1, the male half collar further comprising at least one groove channel configured to each receive a clamping band.

9. The bend restrictor system of claim 1, the top male half collar including at least two alignment protrusions and at least two alignment recesses, and the bottom male half collar including at least two alignment protrusions and at least two alignment recesses.

10. The bend restrictor system of claim 1, the top female half collar including at least two alignment protrusions and at least two alignment recesses, and the bottom female half collar including at least two alignment protrusions and at least two alignment recesses.

11. The bend restrictor system of claim 1, the male half collar further comprising an inner portion including a cable tunnel configured to route a length of protected cable through the male half collar.

12. The bend restrictor system of claim 1, the female half collar further comprising an inner portion including a cable tunnel configured to route a length of protected cable through the female half collar.

* * * * *